Sept. 16, 1969  N. TYLER  3,467,350

VIBRATION DAMPING MOUNT

Filed May 9, 1967  2 Sheets-Sheet 1

INVENTOR.
NELSON TYLER

BY Fulwider, Patton, Rieber,
Lee and Utecht
ATTORNEYS

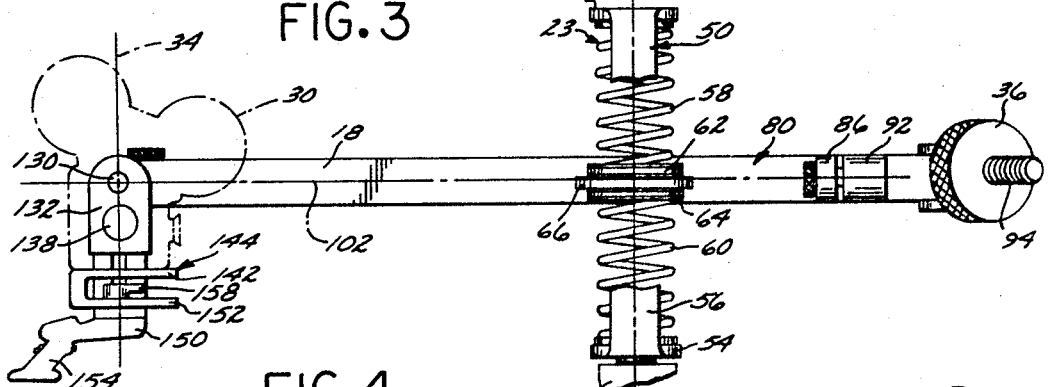
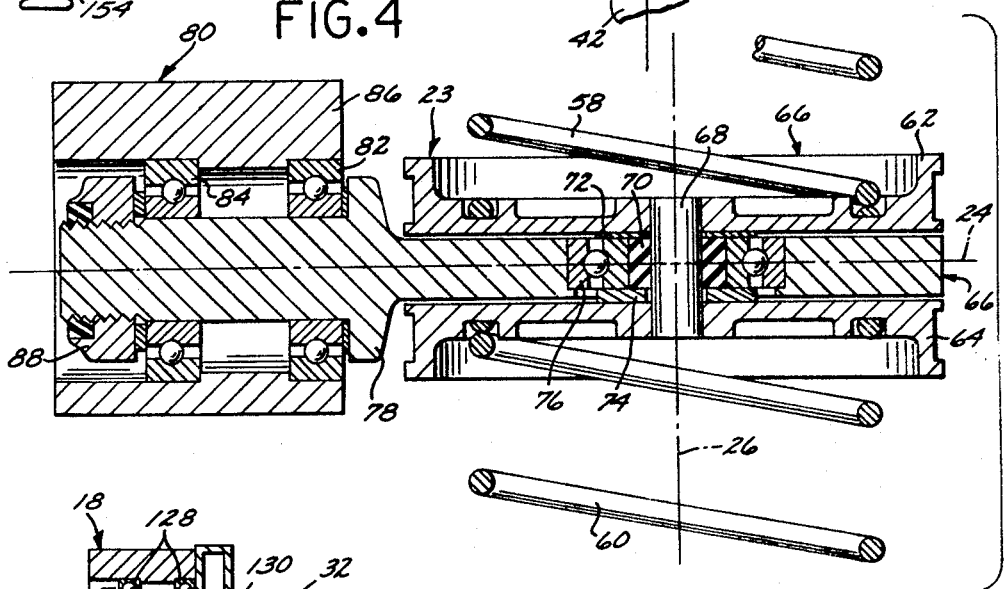
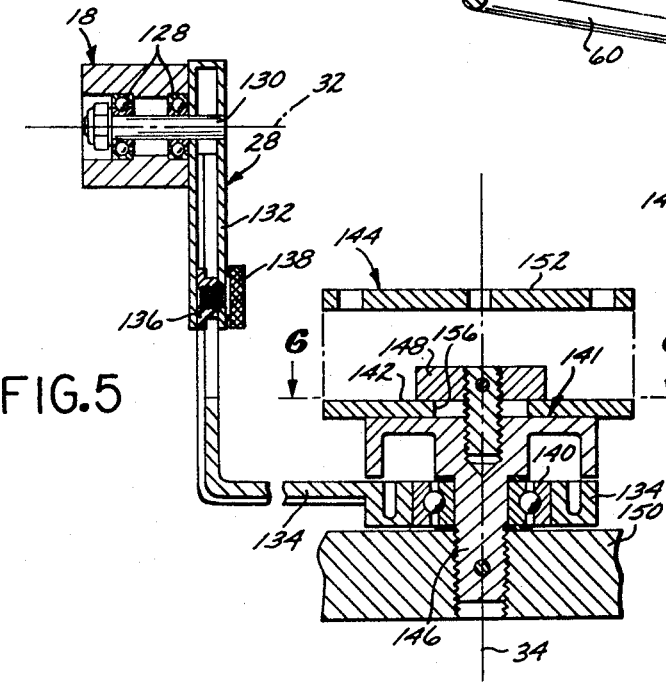
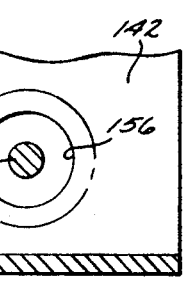

United States Patent Office 3,467,350
Patented Sept. 16, 1969

3,467,350
VIBRATION DAMPING MOUNT
Nelson Tyler, Van Nuys, Calif., assignor to NTT Enterprises, Inc., Hollywood, Calif., a corporation of California
Filed May 9, 1967, Ser. No. 637,215
Int. Cl. F16m *11/12*
U.S. Cl. 248—179                                 10 Claims

ABSTRACT OF THE DISCLOSURE

A vibration damping mount for an instrument such as a camera, and including a vibration damping assembly having a first portion adapted for connection by a vertical post to a supporting platform, and a second portion supported by springs acting against the first portion, the second portion being coupled to the instrument through other elements so that vibrational movements of the instrument relative to the supporting platform are damped, the coupling arrangement between the instrument and such second portion being such as to facilitate seating of an operator between the instrument and the vibration damping assembly.

BACKGROUND OF THE INVENTION

Field of the invention

The present invention relates to mounts operative to support instruments for pivotal movement about a number of different axes, the mounts being characterized by substantial elimination of vibration of the instrument responsive to vibration of the supporting platform.

Related applications

The present invention is related to my copending application for United States Letters Patent, Ser. No. 522,-104, filed Jan. 21, 1966, entitled "Universal Mount," now U.S. Patent No. 3,352,521, and assigned to the assignee of the present case. Application Ser. No. 522,104 is directed to a mount for an instrument such as a camera, and with the mount operating in a manner analogous to that of the present mount. However, as will be seen, the present mount provides a much more compact arrangement through utilization of a different vibration damping system, and also a different means for pivotally connecting together certain of the components of the mount.

Description of prior art

While the present invention is not confined to any specific application, it has particular utility for mounting motion picture cameras in helicopters. The mount of the present invention may also be employed to mount cameras on various other types of vehicles, including dollies in motion picture studios, or to a fixed platform such as a floor. It is adapted to mount various other types of instruments also, such as telescopes, guns, or any other instruments which require mounting in a manner to permit tracking of a target object which is moving relative to the mount.

It is extremely difficult for an operator to hold an instrument such as a heavy movie camera sufficiently steady to obtain pictures unblurred by involuntary movements of the operator. This problem is complicated when the operator is also required to track a moving object, or when the operator is standing or sitting upon a moving, vibrating vehicle, such as a helicopter.

Various types of camera mounts have been advanced in the prior art to hold a camera steady while yet affording a means for moving the camera to track moving target objects. These prior art mounts provide three axes of movement so that the camera can be tipped about its optical axis, tilted in elevation, and panned or rotated in azimuth.

Unfortunately, the prior art mounts do not enable the operator to remain seated, for example, throughout extreme changes in location of the target object. Instead, the operator must move with the camera as it swings about its mount in azimuth, that is, about a vertical pan axis, and as it swings through elevation, that is, about a horizontal tilt axis. The resultant continuous movement of the operator's body is not conductive to good pictures since the movement is also transmitted in part to the camera.

The mount disclosed in the copending application previously mentioned is effective to meet the shortcomings of the prior art except in certain situations. For example, when it is desired to use the mount in a small helicopter, the vibration damping assembly, which also serves as a seat for the operator, does not easily fit in the available floor space. Simply reducing the area of this assembly is not a satisfactory solution since the nature of the damping assembly is such that this naturally reduces its damping effectiveness. For example, lateral sway of the vertically oriented post employed to support the camera and the bulk of the mount above the damping assembly is taken out to a lesser and lesser extent as the distance is decreased between the post and the edges of the damping assembly supporting the post.

Moreover, in my previous mount the camera operator is located between the camera and the post just mentioned and certain of the connections for pivotal movement of the camera about various axes are also located forwardly of the post. This necessitates a long enough mount structure to project the camera well forward of these connections to make room for the operator. Consequently, use of such a mount is somewhat difficult in confined spaces, such as in a small helicopter. However, the present mount locates such pivotal connections rearwardly of the post structure so that the overall mount can be made much shorter and yet comfortably accommodate the camera operator.

SUMMARY OF THE INVENTION

The present invention provides a vibration damping mount for continuous aiming of an instrument, such as a camera, at a moving target object, and utilizes an elongated mounting assembly whose forward extremity mounts the camera for movement about a normally vertical forward pan axis and a normally horizontal forward tilt axis. The rearward extremity mounts a counterbalancing mass, while the whole mounting assembly is supported by a vibration damping assembly for pivotal movement about a vertical rearward pan axis and a normally horizontal rearward tilt axis. With this arrangement, for example, the operator can tilt the forward support upwardly about the forward tilt axis to track a target object, and simultaneously tilt the forward support and the elongated mounting assembly upwardly about the rearward tilt axis to thereby maintain the camera at a convenient height despite its tilted position relative to the forward tilt axis. The same is true during panning of the camera, the arrangement of the spaced-apart forward and rearward pan axes, permitting the operator to track a target object without undue shifting of his body.

It is an object of the invention to provide a mount of the aforementioned character in which the vibration damping assembly includes first and second portions movable relative to each other along a vertical axis, and further includes a bias means interposed between such portions to damp their relative movement.

It is another object of the invention to provide a mount of the aforementioned character which locates the connections affording pivotal movement of the camera about certain axes out of the way of the camera operator and, particularly, on the opposite side of the vertical support structure or post to which the damping assembly is mounted.

Yet another object of the invention is to provide a compact mount adapted to fit into confined spaces, to provide a mount which is attachable to any type of supporting platform, and to provide a mount which is relatively inexpensive to manufacture and maintain.

Still another object of the present invention is to provide a mount in which the mass of the mounted instrument is balanced about its various axes of movement. When such balance is achieved the instrument tends to remain in any position into which it is moved, which is particularly advantageous when the mount is used with a camera for taking moving pictures from a helicopter. The attitude of a helicopter often changes abruptly, and the balanced camera mounting tends to maintain the camera aimed at the target object despite the changed attitude of the helicopter, in a manner somewhat analogous to a gyroscope. Moreover, the balanced arrangement of the camera permits the operator to change the position of the camera without appreciable effort, regardless of the nature of the platform, be it fixed or movable.

Other objects and features of the invention will become apparent from consideration of the following description taken in connection with the accompanying drawings, in which:

BRIEF DESCRIPTION OF DRAWINGS

FIG. 3 is a fragmentary side elevational view of the mount of FIG. 1, portions being cut away for clarity;

FIG. 4 is an enlarged view taken along the line 4—4 of FIG. 2;

FIG. 5 is an enlarged view taken along the line 5—5 of FIG. 2; and

FIG. 6 is an enlarged view taken along the line 6—6 of FIG. 5.

Figure 1:
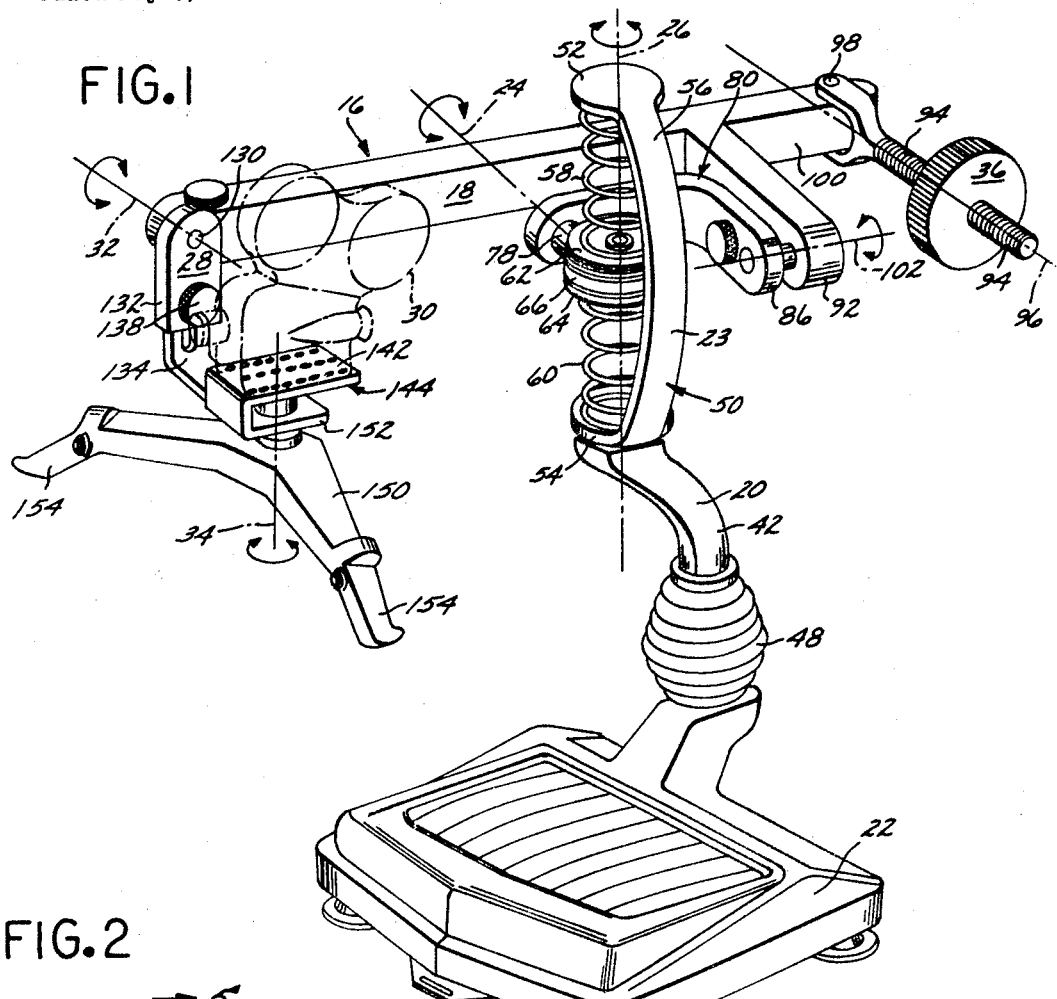
FIG. 1 is a perspective view of a mount according to the present invention.

Referring now to the drawings, and particularly to FIG. 1, there is illustrated a mount 16, according to the present invention, which is operative for continuously aiming an instrument at a target object which is moving relative to the mount 16.

GENERAL DESCRIPTION OF PREFERRED EMBODIMENT

The mount 16 comprises, generally, an elongated mounting assembly 18 generally extending in a fore-and-aft or longitudinal direction; a rearward support assembly 20 connected to a supporting platform 22 and mounting a vibration damping assembly 23 which supports the arm assembly 18 for tilting about a normally horizontal rearward tilt axis 24, and for pivotal movement about a normally vertical rearward pan axis 26; and a forward support assembly 28 which mounts an instrument, which in the present example is a usual and conventional movie camera 30. The support assembly 28 is mounted to the forward extremity of the mounting assembly 18 for tilting about a normally horizontal forward tilt axis 32, and for rotation about a normally vertical forward pan axis 34. The mount 16 also includes a balancing mass which in the present example is constituted by a lead weight 36 coupled to the mounting assembly 18 rearwardly of the rearward tilt axis 24.

Supporting platform

The particular supporting platform 22 illustrated is merely a cushioned seat for the camera operator and is small enough to easily fit into a small helicopter or in similar confined quarters. The horizontally oriented platform 22 is secured by any suitable means (not shown) to the floor of the helicopter between the usual two side doors (not shown) so that the camera 30 can be aimed out of either door.

In the mount of my copending application the platform 22 included a plurality of appropriately located springs or other bias means which were operative to damp out vibrations of the helicopter, including those tending to laterally sway the assembly 20.

Rearward support assembly

The rearward support assembly 20 includes a vertically oriented post 42 which is received within a central opening provided in a generally cylindrical rubber mount 48, which is sometimes referred to as a "Lord" mount. A "Lord" mount is characterized by an ability to permit the post 42 to tip away from its normal axis to a limited extent, while resiliently resisting such movement and tending to isolate the post 42 from vibrations of the platform 22.

The upper extremity of the post 42 terminates in a hollow internally threaded section (not shown) which receives the externally threaded lower extermity of the vibration damping assembly 23. Obviously, the assembly 23 can be assembled quickly and easily to any supporting platform which includes a portion threaded for complemental association with the threaded portion of the assembly 23.

Vibration damping assembly

The threaded lower extremity of the assembly 23 is integral with a relatively fixed damper portion or member 38. The member 50 (or 23) (or 56) is C-shape in configuration and includes a pair of vertically spaced apart, generally circularly formed thrust sections 52 and 54, the lower section 54 having the lower extremity threadably joined to the post 42.

The sections 52 and 54 are integral with an elongated vertically extending connector or strap 56, and seat or retain the adjacent ends of a pair of compression springs 58 and 60. The springs 58 and 60 are vertically oriented along the rearward pan axis 26 and have their adjacent or confronting ends in engagement with a pair of circular spring retainers 62 and 64 which form a part of a relatively movable damper portion or member 66, as best viewed in FIG. 4. With this arrangement, the member 66 is free to move vertically, as well as laterally to a more limited extent, by stretching, compressing, or bowing the springs 58 and 60. In each of these cases, the springs 58 and 60 exert their bias to attenuate or damp the relative movement between the members 50 and 66.

The spring retainers 62 and 64 each include a central bore which receives the opposite ends of a pin 68, the midportion of the pin 68 being disposed through an annular member 70 located between the retainers 62 and 64 and spaced therefrom, respectively, by a pair of washers 72 and 74.

The washers 72 and 74 bear against the opposite sides of the inner race of a ball bearing 76 whose outer race is pressed within an opening provided in one extremity of a coupling pin 78. With this arrangement the pin 78 is pivotable relative to the retainers 62 and 64 and the springs 58 and 60, and about the rearward pan axis 26.

Coupling assembly

The pin 78 forms a part of a coupling assembly 80 which, as will be seen, connects the mounting assembly 18 to the damping assembly 23 for tilting of the assembly 18 about the tilt axis 24, for pivoting of the assembly 18 about the pan axis 26, as mentioned previously, and for pivoting of the assembly 18 about a tip axis.

More particularly, from the damper assembly 23 the coupling pin 78 extends through a pair of spaced apart ball bearings 82 and 84 which are located within an opening in the forward extremity of a right angular arm 86. A shouldered portion of the pin 78, together with a nut 88 threaded onto the outer end of the pin 78, secures the bearings 82 and 84 in position by pressing them against shoulders formed in the walls of the opening in the arm 86, as illustrated in FIG. 4. With this arrangement, the arm 86 is pivotable relative to the damper assembly 23 and about the tilt axis 24.

Figure 2:
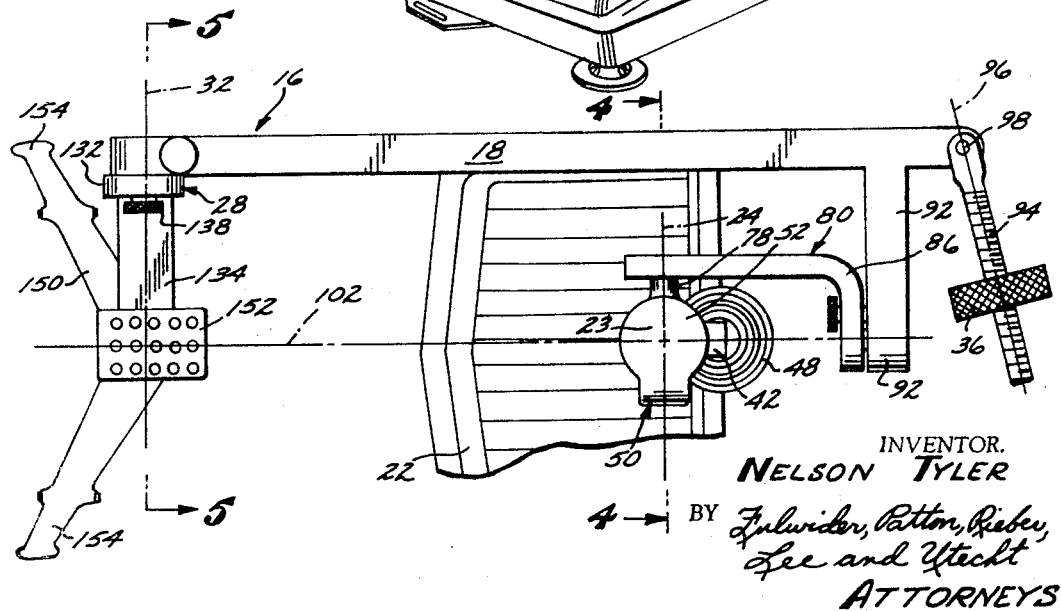
FIG. 2 is a fragmentary top plan view of the mount of FIG. 1.

The arm 86 extends rearwardly, and then laterally inwardly and behind the damper assembly 23, as seen in FIG. 2. Where the longitudinal or fore-and-aft axis passing through the center of the damper assembly 23 passes through the lateral leg of the arm 86, the arm 86 is pivotally mounted to the rearward extremity of the mounting assembly 18. This extremity is constituted by a laterally extending arm 92, the arm 92 and the arm 86 being pivotable relative to one another about a tip axis 102.

Counterbalance

In the particular embodiment illustrated, a counterbalancing weight for the camera 30 is provided by the lead weight 36. The weight 36 is threadably carried at one extremity of an elongated stud 94 which defines a weight axis 96. The opposite end of the stud 94 is bifurcated and mounted by a pin 98 to a rearward extension 100 of the mounting assembly 18 for pivotal movement about a vertical axis. Depending upon the orientation of the weight axis 96, threading the weight 36 in and out alters the balance of the mount 16 and camera 30 about the tilt axis 24, the tip axis 102, or both.

Mounting assembly

The elongated mounting assembly 18 is located laterally outwardly of the longitudinal tip axis 102. As best viewed in FIGS. 1, 2 and 5, the forward extremity of the mounting assembly 18 includes an opening which receives a pair of transversely spaced-apart roller bearings 128 for rotation upon a pin 130 which forms a part of the forward support assembly 28. The axis of this rotation constitutes the forward tilt axis.

Forward support assembly

The outer extremity of the pin 130 is rigidly fixed to a hollow, vertically oriented head 132 which vertically slidably receives the slotted vertical leg of a right angular slider arm 134. The hollow head 132 internally carries a nut 136 which is engaged by the stud portion of a knurled knob 138, which is threaded through the head 132. Tightening the knob 138 brings the nut 136 to bear against the vertical leg of the slider arm 134, and thereby adjusting the vertical position of the camera 30.

As best viewed in FIGS. 5 and 6, the horizontal leg of the slider arm 134 extends toward the tip axis 102 and includes a vertical opening within which is pressed a ball bearing 140. The inner race of the bearing 140, which is free to rotate relative to the arm 134, bears against a washer which in turn bears against the underside of a spacer 141 located between the arm 134 and the lower leg 142 of a channel shape camera plate 144. The spacer includes a vertically oriented stud portion 146 which passes through the bearing 140 and is pinned to a handle assembly 150. The threaded stud portion of an anchoring bolt or knob 148 extends through an opening 156 provided in the leg 142 and is threaded into an opening in the top of the spacer 141. The knob 148 includes a projection or headed portion having a tab 158 which facilitates turning of the knob 148 to thereby clamp together the spacer 141 and the camera plate 144 so that these rotate with the inner race of the bearing 140, with the handle assembly 150, and about the vertically oriented forward pan axis 34.

The diameter of the opening 156 is made much greater than the diameter of the stud portion of the knob 148 so that by loosening the knob 148, the camera plate 144 can be moved laterally and longitudinally to adjust the weight of the plate 144 and the camera 30 thereon opposite sides of the tip axis 102 and the tilt axis 32.

An upper leg 152 of the camera plate 144 includes a plurality of mounting holes so that various types of cameras 30 can be accommodated by the mount 16, and so that the camera can be moved about or relocated on the leg 152 for best balance of its weight about the various axes.

The handle assembly 150 which extends below the camera plate 144 includes transversely spaced apart grips 154 for use by the operator in manipulating the camera 30 into desired position. As more particularly described in my copending application, the grips 154 may include switches for operating electrical currents connected to the camera motor, camera "zoom" lens, and the like.

Clutch devices

Although not illustrated in detail, friction clutch devices are preferably provided at each pair of relatively movable components which define the various axes of movement. This adjusts the degree of rotational friction present between such components. The clutch devices can be adjusted to fix these various components against relative rotation during shipping, handling, and balancing of the mount 16, and can also be adjusted to provide a very slight frictional "drag" between the components during operation of the mount 16. A slight frictional drag has been found to give the operator better control of the aiming of the camera.

Balancing and operation

Assuming that the camera mount 16 is to be used in a helicopter, the supporting platform 22 is mounted in any suitable manner to the floor of the helicopter and oriented so that the operator can aim the camera 30 out of either of the side doors of the helicopter. The space between the camera 30 and the damping assembly 23 provides a space in which the operator can sit.

The camera 30 is next balanced about its various axes of movement. More particularly, with the mounting assembly 18 maintained level, that is, in the horizontal position illustrated in FIG. 1, the operator tilts the camera 30 about the forward tilt axis 32 until it points downward, with the forward pan axis 34 horizontally oriented. The knob 138 is then loosened to permit adjustment of the mass of the camera on opposite sides of the forward tilt axis 32. Knob 138 is tightened.

Next, the operator pivots the camera 30 about the forward tilt axis 32 until it is level, with its optical axis or line of sight horizontally oriented. Knob 148 is then loosened to permit the camera 30 to be balanced fore-and-aft relative to the forward tilt axis 32. It should be particularly noted that this adjustment also balances the camera mass on the fore-and-aft and left and right sides of the forward pan axis 34, since the axes 32 and 34 intersect.

The weight of the lead weight 36 should be approximately what is required to balance the mass of the camera 30 and the other items on the opposite side of the axis 24, it being noted that this weight can be varied by positioning the weight 36 along the length of the stud 94, and also by pivoting the stud 94.

Pivoting the stud 94 also affects balancing of the mount 16 about the remaining axis, the longitudinal tip axis 102. Balance about this axis is also provided by loosening the knob 148 and moving the camera plate and camera 30, thereby shifting the center of gravity of the camera 30 in a transverse direction.

Operation of the mount 16 is then accomplished by movement of the grips 154 in the directions necessary to pan, tilt, or tip the camera 30 so as to follow the object being photographed, as will be apparent.

From the foregoing, it will be apparent that a compact mount has been provided which is particularly adapted for mounting a camera 30 in a small helicopter, or in other small spaces, in a manner effective to damp or isolate the vibrations of the helicopter from the camera 30, and in a manner which tends to maintain the camera 30 balanced about its various axes of movement so that it tends to maintain an aimed position despite the changing attitudes of the helicopter. Moreover, the location of the damping assembly 23 in substantial alignment with the axes 24, 26 and 102 permits vibration damping with a greatly simplified structure, as compared to the supporting platform damping of the prior art.

It will also be apparent that instruments other than the camera 30 can be mounted upon the mount and balanced in a corresponding manner. Telescopes, range finders, and armaments fall into this catagory, and similar applications will suggest themselves to those skilled in the art. Moreover, the present mount can be attached to a studio dolly so that the advantages inherent in the balanced camera mounting can be made available in making studio motion pictures. The sensitivity of the mount permits an operator to closely follow the movement of actors and the like.

If desired, the mount can be fixed to the ground on to a building floor or the like and operated without any vibration damping structure such as the support platform 22.

Various modifications and changes may be made with regard to the foregoing detailed description without departing from the spirit of the invention or the scope of the following claims. In the claims which follow, the terminology "horizontal," "vertical," "forward," "rearward," and like expressions have reference to the normal orientation of the mount components, as illustrated in FIG. 1. It will be apparent that such terminology is also intended to comprehend the changing attitudes of the mount components as such components are pivoted about their various axes of movement.

I claim:

1. A vibration damping mount for an instrument, said mount comprising:
   vibration damping means including first and second portions movable laterally relative to each other and also movable relative to each other along a vertical axis, and bias means interposed between said first and second portions and tending to damp relative movement therebetween, said first portion being adapted for connection to a supporting platform;
   elongated mounting means having a forward extremity for supporting an instrument and a rearward extremity for mounting a mass to aid in balancing the weight of said instrument about a normally horizontal tilt axis;
   and coupling means connecting said mounting means to said second portion of said damping means for tilting of said mounting means about said tilt axis.

2. A vibration damping mount according to claim 1 wherein said bias means includes a pair of springs located respectively, above and below one of said portions, and exerting their bias against both said first and second portions.

3. A vibration damping mount according to claim 1 wherein said first portion includes a pair of vertically spaced apart sections, and said second portion is interposed between said sections, and wherein said bias means includes a pair of springs located, respectively, above and below said second portion and exerting their bias against both said first and second portions.

4. A vibration damping mount according to claim 1 and including a mass mounted to the rearward extremity of said mounting means and constituted by an elongated element connected at one end to said rearward extremity, and by a weight supported by and adjustably movable along the length of said element.

5. A vibration damping mount according to claim 4 wherein said element is pivotally mounted at said one end for swinging said weight in a substantially horizontal plane.

6. A vibration damping mount according to claim 1 wherein said bias means is generally aligned with said vertical axis and said tilt axis.

7. A vibration damping mount according to claim 1 wherein said mounting means includes a transverse arm connected to said coupling means for pivotal movement of said mounting means about a normally horizontally oriented fore-and-aft tip axis.

8. A vibration mounting means according to claim 7 wherein said bias means is located adjacent the intersection of said vertical axis, said tilt axis, and said tip axis.

9. A vibration damping mount for an instrument, said mount comprising:
   vibration damping means including a first portion having spaced apart abutments, a second portion movable relative to said first portion along a vertical axis and located between said abutments, and a pair of springs on opposite sides of said second portion and exerting their bias against said first and second portions to thereby tend to damp relative movement therebetween, one of said portions being adapted for connection to a supporting platform;
   elongated mounting means having a forward extremity for supporting an instrument and a rearward extremity for mounting a mass to aid in balancing zontal tilt axis said mounting means also having a lateral portion;
   and a coupling arm having a portion coupled to the other one of said portions of said damping means for relative pivotal movement about said horizontal tilt axis, and further having a laterally directed portion coupled to said lateral portion of said mounting means for relative pivotal movement about a fore-and-aft tip axis passing through said damping means.

10. A vibration damping mount according to claim 9 wherein said one of said portions of said damping means is said first portion, and the other of said portions of said damping means is said second portion.

References Cited

UNITED STATES PATENTS

| 1,873,834 | 8/1932 | Fleckenstein | 248—358 |
| 3,044,346 | 7/1962 | Fieux | 248—123 X |
| 3,073,343 | 1/1963 | Mowell | 240—280 X |
| 3,334,848 | 7/1967 | Iwai | 248—358 X |

CHANCELLOR E. HARRIS, Primary Examiner

U.S. Cl. X.R.

248—325, 358, 364

PO-1050
(5/63)

UNITED STATES PATENT OFFICE
CERTIFICATE OF CORRECTION

Patent No. 3,467,350          Dated September 16, 1969

Inventor(s)          Nelson Tyler

It is certified that error appears in the above-identified patent and that said Letters Patent are hereby corrected as shown below:

Column 5, line 73, after the word "thereon" insert --on--
Column 7, line 7, after the word "platform" insert --spring--.
Column 7, line 18, delete the word "on" and insert --or--.
Claim 9, line 35, after the word "balancing" insert --the weight of said instrument about a normally hori---.

SIGNED AND
SEALED
MAY 5 1970

(SEAL)
Attest:

Edward M. Fletcher, Jr.
Attesting Officer

WILLIAM E. SCHUYLER, JR.
Commissioner of Patents